US009989382B2

(12) United States Patent
Anastasiadis et al.

(10) Patent No.: US 9,989,382 B2
(45) Date of Patent: Jun. 5, 2018

(54) DETECTING MOVEMENT OF A SEATBELT SENSOR (71) Applicant: LITTELFUSE, INC., Chicago, IL (US)

(72) Inventors: Ioannis Anastasiadis, Norwich (GB); Samuel Fuller, Farmington Hills, MI (US); Zulqarnain Khan, Norfolk (GB)

(73) Assignee: HAMLIN ELECTRONICS (SUZHOU) CO., LTD., Suzhou, Jiangsu Province (CN)

( * ) Notice: Subject to any disclaimer, the term of this patent is extended or adjusted under 35 U.S.C. 154(b) by 93 days.

(21) Appl. No.: 14/943,755

(22) Filed: Nov. 17, 2015

(65) Prior Publication Data
US 2017/0138766 A1    May 18, 2017

(51) Int. Cl.
*G01D 5/20*    (2006.01)
(52) U.S. Cl.
CPC ...................... *G01D 5/20* (2013.01)
(58) Field of Classification Search
None
See application file for complete search history.

(56) References Cited

U.S. PATENT DOCUMENTS

| | | | |
|---|---|---|---|
| 5,028,750 A | 7/1991 | Spies et al. | |
| 5,779,178 A | 7/1998 | McCarty | |
| 6,868,745 B2 * | 3/2005 | Sullivan | B60R 22/48 73/862.391 |
| 7,014,005 B2 * | 3/2006 | Martinez | B60R 22/48 180/268 |
| 2003/0160509 A1 | 8/2003 | Patterson et al. | |
| 2005/0201827 A1 | 9/2005 | Rastegar et al. | |
| 2014/0188347 A1 | 7/2014 | Tabe | |
| 2015/0266440 A1 | 9/2015 | Johnson et al. | |

OTHER PUBLICATIONS

ISR and Written Opinion dated Jan. 12, 2017 in corresponding PCT/US2016/061317.

* cited by examiner

*Primary Examiner* — Jermele M Hollington
*Assistant Examiner* — Douglas X Rodriguez (57) ABSTRACT

Provided herein are approaches for detecting movement of a seatbelt sensor. In some approaches, a detector includes a sensor housing coupled to a plate of a vehicle restraint system, and a sensor disposed within the sensor housing, wherein the sensor is operable to sense a position of a magnet in proximity to the sensor. The detector further includes a magnetic field accumulator (e.g., a pole-piece) coupled to the sensor, wherein the magnet and the magnetic field accumulator move relative to one another, and wherein the sensor receives an indication of a magnetic field accumulated by the magnetic field accumulator as the magnet and the magnetic field accumulator move relative to one another. A change in the magnetic field distribution correlates to a change in position of the plate, to which the magnet is coupled.

17 Claims, 8 Drawing Sheets

DETECTING MOVEMENT OF A SEATBELT SENSOR

FIELD OF THE DISCLOSURE

The disclosure relates generally to the field of vehicle restraint systems and particularly to sensors for vehicle restraint systems.

BACKGROUND OF THE DISCLOSURE

Vehicle restraint systems, also referred to as "seat belts", are used to secure an occupant within a vehicle. A common vehicle restraint system includes a lap belt and a shoulder belt. Typically, the lap belt and the shoulder belt are connected together at one end and include a latch plate. The other end of the shoulder belt and lap belt is connected to the vehicle structure. A safety seatbelt buckle configured to receive the latch plate is also connected to the vehicle structure. When the buckle and the latch plate are connected (e.g., across an occupant's shoulder and waist), the vehicle restraint system may operate to restrain movement of the occupant, e.g., during breaking or a collision.

The buckle may identify whether a driver and/or an occupant wears the seatbelt. For this purpose, the buckle normally includes a mechanical switch such as a microswitch that may be operated with a tongue of the belt. In one approach, the switch is actuated in response to the insertion or removal of the tongue, so that an indicator, e.g., on an instrument panel, is activated.

The buckle further may further include a self-diagnostic function, for example, in which a non-contact switch such as a hall sensor performs a self-diagnostic analysis of an electronic control unit (ECU). However, current art systems are limited to either a magnetic sensor circuit detection, where a magnet is actuated merely to detect lock and un-lock positions, or other kinds of sensing measurements such as an optical detector. Accuracy and reliability of these current art systems may be affected, however, by external mechanical vibration modes, application mechanical tolerances, and/or by external magnetic fields.

SUMMARY

In view of the foregoing, provided herein are approaches for detecting movement of a seatbelt sensor. In one approach, a detector includes a sensor housing coupled to a plate of a vehicle restraint system, and a sensor disposed within the sensor housing, the sensor operable to sense a position of a magnet in proximity to the sensor. The detector further includes a magnetic field accumulator disposed adjacent the sensor, wherein the magnet and the magnetic field accumulator are configured to move relative to one another, and wherein the sensor receives an indication of a magnetic field accumulated by the magnetic field accumulator as the magnet and the sensor move relative to one another.

Another approach includes a system for detecting movement of a sensor, the system including a sensor housing coupled to a plate of a vehicle restraint system, and a sensor and a pole-piece disposed within the sensor housing, the sensor operable to sense a position of a magnet in proximity to the sensor. The magnet and the pole-piece are operable to move relative to one another, wherein the sensor receives an indication of a magnetic field accumulated by the pole-piece as the magnet and the pole-piece move relative to one another.

Yet another approach includes a method of detecting movement of a sensor, the method including providing a sensor within a sensor housing of a vehicle restraint system, the sensor operable to sense a position of a magnet in proximity to the sensor, and providing a magnetic field accumulator proximate the sensor. The method further includes receiving an indication of a magnetic field in proximity to the magnetic field accumulator, and determining a position of the magnet relative to the sensor based on the indication of the magnetic field.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

DETAILED DESCRIPTION

Various approaches in accordance with the present disclosure will now be described more fully hereinafter with reference to the accompanying drawings, where embodiments of a system and method are shown. The system and method may be embodied in many different forms and are not be construed as being limited to the embodiments set forth herein. Instead, these embodiments are provided so this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts, with respect to the geometry and orientation of a component of a semiconductor manufacturing device as appearing in the figures. The terminology will include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

As stated above, provided herein are approaches for detecting movement of a seatbelt sensor. In some approaches, a detector includes a sensor housing coupled to a plate of a vehicle restraint system, and a sensor disposed within the sensor housing, wherein the sensor is operable to sense a position of a magnet in proximity to the sensor. The detector further includes a magnetic field accumulator (e.g., a pole-piece) coupled to the sensor, wherein the magnet and the magnetic field accumulator move relative to one another, and wherein the sensor receives an indication of a magnetic field accumulated by the magnetic field accumulator as the magnet and the magnetic field accumulator move relative to one another. The magnetic field accumulator, working as an accumulator of the magnetic field, improves the shape of and guides the flux field generated by the magnet to ensure that the magnetic field strength is recognized by the sensor. The sensor is made more robust and accurate over a wider range when combined with the magnetic field accumulator. Thus, the sensor detected change in the magnetic field distribution assists in determining a change in position of the plate.

Figure 1:
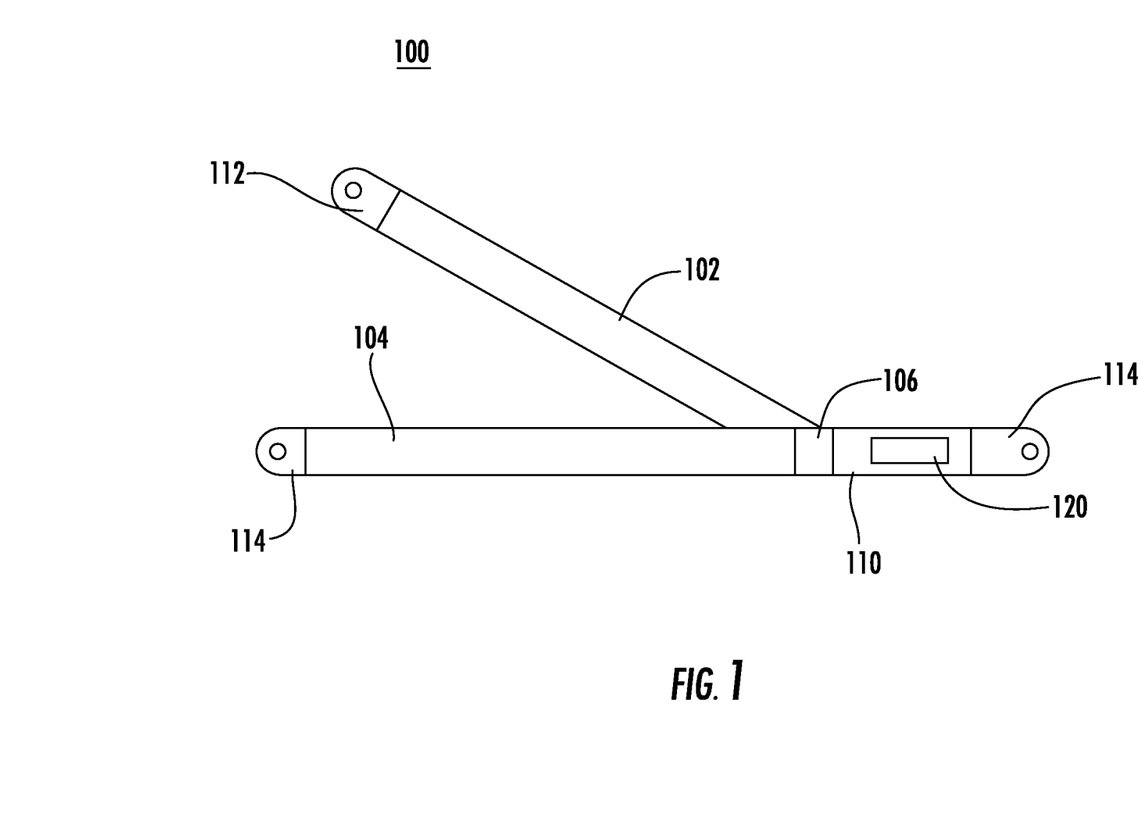
FIG. 1 is a block diagram illustrating a vehicle restraint system including a plate type sensor system in accordance with the present disclosure.

Referring now to FIG. 1, shown is a block diagram of an example vehicle restraint system 100, which may be implemented in a vehicle. In particular, the vehicle restraint system 100 may be implemented in a vehicle along with one or more inflatable restraints. The deployment of the inflatable restraint systems may be determined based on output from a sensor in the vehicle restraint system 100, as described in greater detail below. In particular, the sensor may be used to determine the tension of the vehicle restraint system and may be used to determine whether an occupant in the vehicle is an adult, a child, and/or a child in a child seat.

As shown, the vehicle restraint system 100 includes a shoulder belt 102, a lap belt 104, and a latch plate 106. In one embodiment, the shoulder belt 102 and the lap belt 104 may be connected together at one end and coupled to the latch plate 106. The vehicle restraint system 100 further includes a buckle 110. The buckle 110 is configured to receive the latch plate 106, which may be inserted into the buckle 110 and secured therein to restrain the shoulder belt 102 and the lap belt 104, for example, in the event of a collision, braking, etc.

Each of the shoulder belt 102, the lap belt 104, and the buckle 110 includes an attachment point, such as the shoulder belt attachment point 112 and/or the lap belt attachment point 114. The attachment points 112, 114 may be used to secure the other ends of the shoulder belt 102, the lap belt 104, and the buckle 110 to the vehicle structure.

The buckle 110 further includes a plate type tension sensor system 120. The sensor system 120 is depicted within in the buckle 110. However, this is done for illustrative purposes only and is not intended to be limiting. Some embodiments may include the sensor system 120 separate from the buckle 110. For example, the sensor system 120 may be attached between the buckle 110 and the buckle attachment point 114. As another example, multiple sensors may be implemented. For example, a first sensor may be included between the shoulder belt attachment point 112, and a second sensor may be included between the lap belt attachment point 114.

Furthermore, it will be appreciated that the vehicle restraint system 100 is merely illustrative and may include only a lap belt 104 or only a shoulder belt 102. Furthermore, other configurations, such as a 5-point harness or the like, may be implemented with the plate type tension sensor system 120 described herein. Still furthermore, the vehicle restraint system 100 may be implemented in any type of vehicle (e.g., automotive, marine, aircraft, or the like), and may be implemented in one or more seats (e.g., front seat, back seat, driver seat, passenger seat, middle seat, or the like) within the vehicle.

Figure 2:
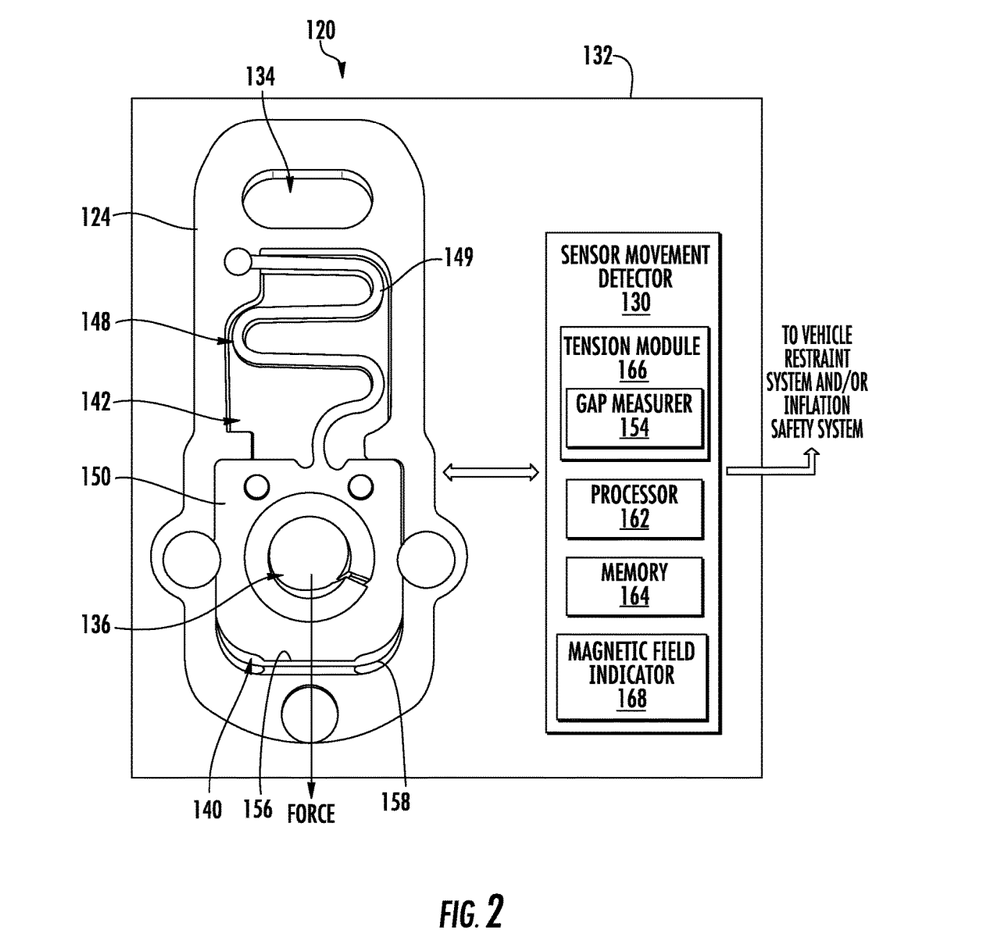
FIG. 2 is block diagram of the sensor system of FIG. 1 in accordance with the present disclosure.

Turning now to FIG. 2, illustrated is a block diagram of the plate type tension sensor system 120. The plate type tension sensor system 120 shown in FIG. 2 is described with reference to the vehicle restraint system 100 of FIG. 1. However this is not intended to be limiting, and the plate type tension sensor system 120 may be implemented to determine tension within a vehicle restraint system different than the vehicle restraint system shown in FIG. 1.

As shown in FIG. 2, the sensor system 120 includes a plate 124 (e.g., a base plate) and a sensor movement detector 130 enclosed in a housing 132. In some embodiments, the sensor system 120 may not include a housing. For example, the plate 124 and the sensor movement detector 130 may be disposed in the vehicle restraint system 100 but not enclosed within a housing. Furthermore, the housing 132 may be formed from a variety of materials and may be included to house only portions of the sensor system 120. For example, the plate 124 and sensor movement detector 130 may be enclosed within the housing 132, while the ends of the plate 124 protrude from the housing to be attached to the vehicle restraint system 100.

The plate 124 includes a first fixing aperture 134, a second fixing aperture 136, a gap 140, and cutouts 142. The plate 124 may be formed from a variety of materials (e.g., steel, steel alloys, aluminum, or the like). In general, the plate 124 may be formed from a material of sufficient strength and integrity to withstand the tension that the vehicle restraint system 100 might encounter during use (e.g., in normal operation, in a crash situation, or the like). Furthermore, the plate 124 may be formed from a single piece of material. Said differently, the plate 124 may be manufactured (e.g., stamped, cut, formed, or the like) from a single piece of material, thereby reducing part count and simplifying manufacture.

The first and second fixing apertures 134, 136 are provided to attach the sensor system 120 to the vehicle restraint system 100 (FIG. 1). For example, one of the first and second fixing apertures 134, 136 can be used to secure the sensor system 120 to an end of the shoulder belt 102, and/or the buckle 110, while the other one of the first and second fixing apertures 134, 136 can be used to secure the sensor system 120 to the vehicle structure. As another example, the first and second fixing apertures 134, 136 can be used to secure the sensor system 120 between either the shoulder belt attachment point 112 and/or the lap belt attachment point 114, and one of the shoulder belt 102, the lap belt 104, and/or the buckle 110.

As depicted, the cutouts 142 form a spring-like structure 148 disposed within an interior portion of the plate 124, which allows the apertures 134, 136 to move (e.g., open and close) as tension is applied to a seat belt (e.g., the shoulder belt 102 or the lap belt 104 to which the sensor system 120 is attached. Portions of the plate 124 may be removed (e.g., by stamping, by cutting, by EDM machining, or the like) to form the gap 140 and the spring structure 148. The spring structure 148 includes a first section 149 including a plurality of undulations, and a spring plate 150 attached with the first section 149, wherein the spring plate 150 contains fixing aperture 136 disposed therein.

In exemplary embodiments, the spring structure 148 allows movement of the apertures 134, 136 relative to each other. This movement may be dependent upon the amount of force applied to the apertures 134, 136, which may translate to a tension in the vehicle restraint system 100 to which the plate type tension sensor system 120 is mounted. A width of the gap 140 can be measured, e.g., by a gap measurer 154 to determine the force and/or tension. Furthermore, a tension limit can be manufactured into the sensor (e.g., by limiting the gap width). Accordingly, once the maximum tension is applied (e.g., the gap width is substantially zero) the gap 140 will be closed such that an edge 156 of the spring plate 150 will abut an edge 158 on an opposite side of the gap 140. In one embodiment, the edges 156 and 158 are coplanar. As such, the edge 156 may be face-to-face with and/or in contact with the edge 158.

In one embodiment, the cutouts 142 may allow the first and second fixing apertures 134, 136 to move relative to each other. More specifically, when force is applied to the first and second fixing apertures 134, 136, they may move apart from each other. For example, during use, the first fixing aperture 134 may be fixed in place (e.g., secured to the vehicle structure, or the like), while the second fixing aperture 136 is secured to the shoulder belt 102. As the shoulder belt 102 is tightened, force may be applied (e.g., in the direction shown in FIG. 2), which acts to pull the apertures, such as the first and second fixing apertures 134, 136, apart from one another. Accordingly, the edge 156 of the spring plate 150 may move into the gap 140, thereby reducing the width of the gap 140.

As further shown, the sensor movement detector 130 includes a processor 162, a memory 164, a tension module 166, and a magnetic field indicator 168. As will be described in further detail below, the sensor movement detector 130 may be configured to communicate with a sensor of the vehicle restraint system, wherein the sensor is operable to sense a position of a magnet in proximity to the sensor. The sensor movement detector 130 may receive a measurement/output from the magnetic field indicator 168 of a magnetic field in proximity to a magnetic field accumulator coupled to the sensor, and determine a position of the magnet relative to the magnetic field accumulator and the sensor based on the measurement of the magnetic field.

In some embodiments, the tension module 166 may be configured to determine the tension applied to the vehicle restraint system 100. For example, the tension module 166 can be configured for determining an amount of tension applied to one of the first and second fixing apertures 134, 136 based at least in part upon a width of the gap 140 in relation to movement of the first and second fixing apertures 134, 136. As shown, the tension module 166 further includes the gap measurer 154. In general, the gap measurer 154 is configured to measure the width of the gap 140, wherein the gap width may be defined as the width between edges 156 and 158.

In some embodiments, the processor 162 may be a general purpose processor, a microprocessor, an FPGA, an ASIC, or in general, any computing device configured to execute instructions. The memory 164 may be a computer readable medium, a computer readable storage medium, including non-volatile computer readable medium and/or non-transient computer readable medium configured to store computer executable instructions, that when executed by the processor 162, cause the processor 162 to perform one or more operations. In particular, the memory 164 may store one or more instructions that when executed by the processor 162 cause the processor 162 to determine the tension applied to the sensor system 120 and movement of various components of the sensor system 120. For example, the instructions may cause the processor 162 to sense a position of a magnet in proximity to a sensor, receive an indication of a magnetic field in proximity to the pole-piece, and determine a position of the plate 124 relative to the spring structure 148 based on the indication of the magnetic field.

Figure 3:
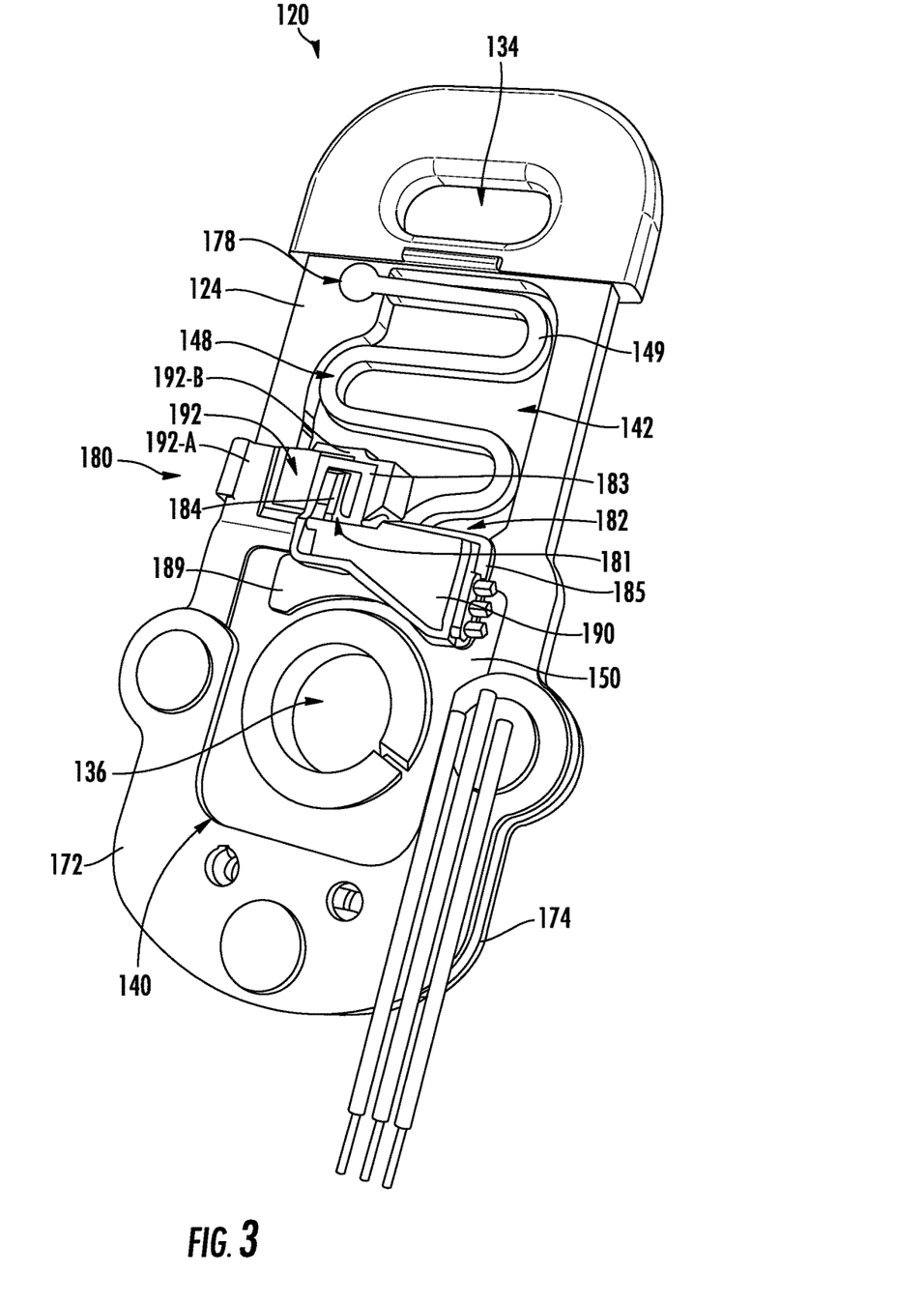
FIG. 3 is a perspective view of the sensor system of FIGS. 1-2 in accordance with the present disclosure.

Referring now to FIG. 3 a sensor system will be described in greater detail. As shown, the sensor system 120 includes a plate 124 includes fixing apertures 134 and 136. The sensor system 120 further includes first and second alignment plates 172 and 174 coupled to opposite sides of the plate 124. Similar to above, the sensor system 120 includes cutouts 142 to allow the fixing apertures 134 and 136 to move relative to one another as force is applied to either of the fixing apertures 134 and 136. In particular, the cutouts 142 allow the fixing aperture 136 to move away from the fixing aperture 134 to reduce the width of the gap 140. It should be noted that in one embodiment, the cutouts 142 can be formed (e.g., machined) from the plate 124. In an alternative embodiment, the cutouts 142 can be machined from an alternative plate having one of a variety of materials (e.g., steel, steel alloys, aluminum, or the like) and having a greater strength and/or thickness as compared to the plate 124. The cutouts 142 formed (e.g., cutout) from the alternative plate can then be coupled to the plate 124 at a joint 178. That is, the cutouts 142 formed from the alternative plate can then be welded to the plate 124 at the joint 178. The cutouts 142 formed from the alternative plate and welded to the plate 124 provide for additional strength and durability for the plate 124.

The alignment plates 172, 174 are depicted as having apertures defined therein, with the plate 124 received between the alignment plates 172, 174. The fixing aperture 136 is centered with the apertures defined in each of the alignment plates 172, 174. That is, alignment plate 172 is coupled to one side of the plate 124, such as a top side, and alignment plate 174 is coupled to an opposite side of the plate 124, such as a bottom side, with the alignment plates 172, 174 positioned such that fixing aperture 136 and the apertures defined in each of the alignment plates 172, 174 are aligned with the fixing aperture 136. In one embodiment, the alignment plates 172, 174 are both coupled to the fixing aperture 136 and simultaneously move away from the fixing aperture 134 to reduce the width of the gap 140. That is, the alignment plates 172, 174, along with the fixing apertures 134 and 136, move together (e.g., open and close) as tension is applied to a seat belt (e.g., the shoulder belt 102, the lap belt 104, or the like) to which the plate 124 is attached. In one embodiment, the alignment plates 172, 174 keep the spring structure 148 aligned with the plate 124, such as in a coplanar arrangement.

Figure 4:
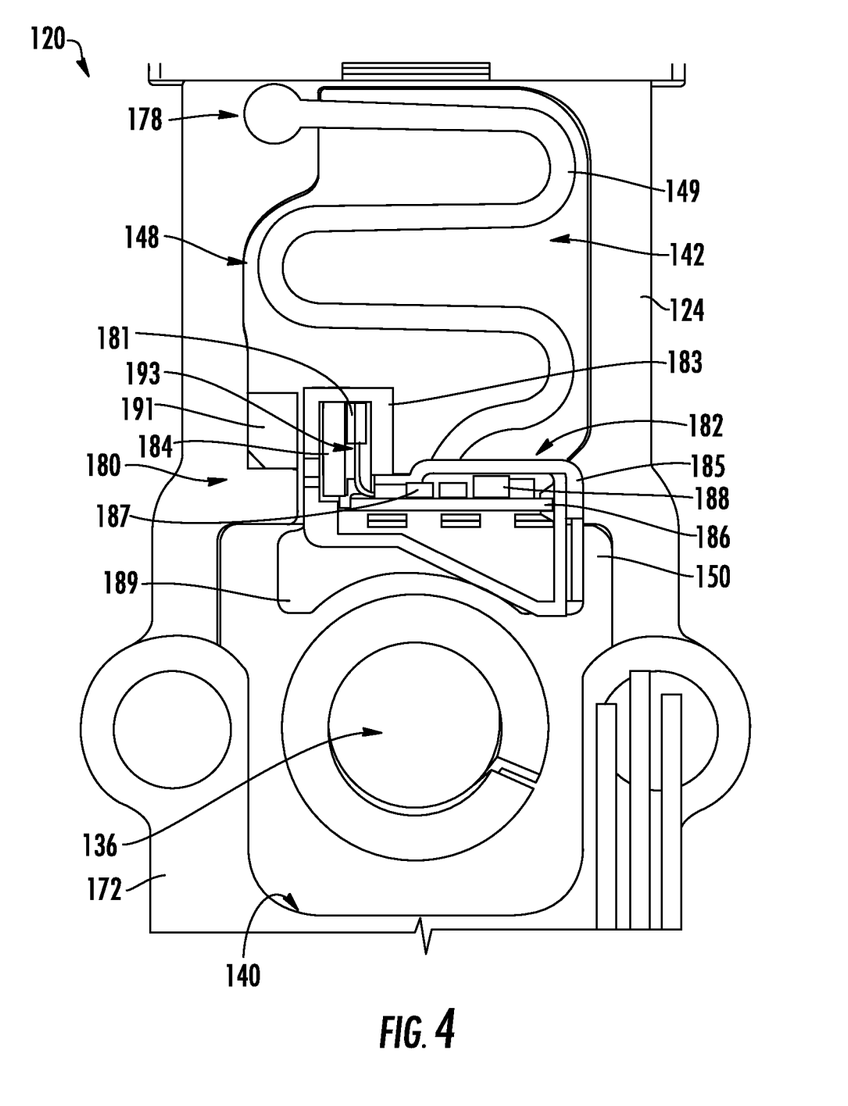
FIGS. 4-5 are perspective partial views of the sensor system of FIGS. 1-3 in accordance with the present disclosure.
Figure 5:
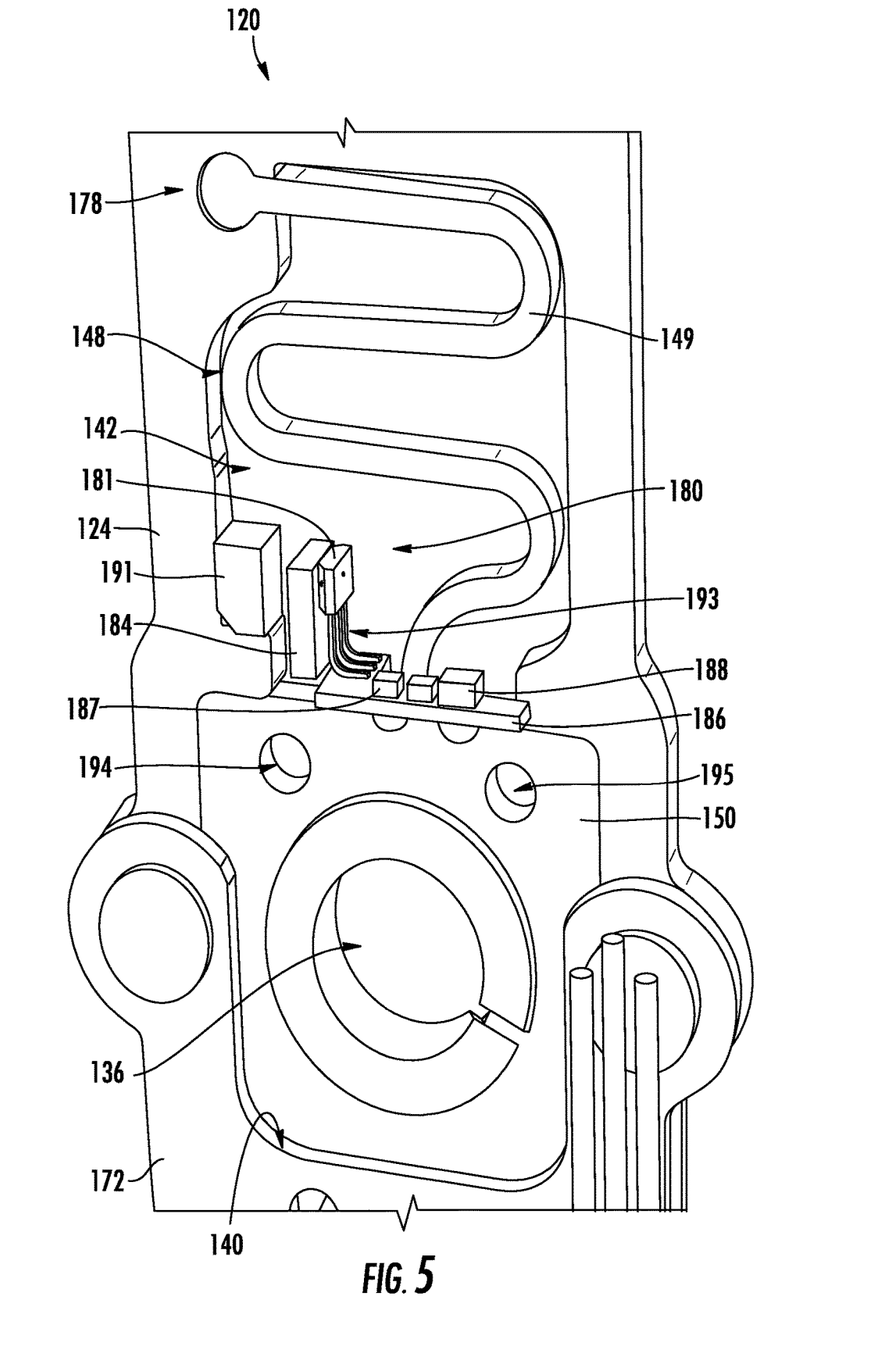

Referring now to FIGS. 3-5, a detector will be described in greater detail. As shown, the sensor system 120 includes a detector circuit 180 including a sensor 181 (e.g., a sensor chip) disposed within a sensor housing 182 that is coupled to the plate 124. The sensor housing 182 may include a first section 183 housing the sensor 181 and a magnetic field accumulator 184 adjacent/coupled to the sensor 181, a second section 185 containing a plurality of electrical components for the sensor 181 such as a printed circuit board (PCB) 186, one or more capacitors 187, and a resistor 188, and a third section 189 extending from the second section 185. As shown, a cover 190 (FIG. 5) is provided over the second section 185 and partially over the first section 183. In some embodiments, the sensor housing 182 can be filled with a potting material (e.g., an epoxy) and sealed with a seal. A set of wire lines 193 provide input/output lines for electrically coupling the sensor 181 to a power source and/or the sensor movement detector 130 of FIG. 2.

As further shown in FIGS. 4-5, the sensor housing 182 may be coupled to the spring plate 150 of the spring structure 148. More specifically, the third section 189 of the sensor housing 182 can be coupled to the spring plate 150 via one of a variety of securing means, such as, for example, pegs or pins inserted through openings 194, 195 in the spring plate 150 and/or secured via an adhesive substance, a snap-fit attachment mechanism, solder, and/or other techniques for securement.

The detector circuit 180 further includes one or more magnets 191 coupled to the plate 124, for example, in an area of one of the cutouts 142, which are covered by a magnet housing 192 (FIG. 3). In one embodiment, the magnet housing 192 is disposed adjacent the sensor housing 182. In another embodiment, the magnet housing 192 includes a first section 192-A disposed proximate the magnet 191 and a second section 192-B disposed around the first section 183 of the sensor housing 182. The magnet 191 may be formed from molded ferrite or can be formed from samarium cobalt or neodymium iron boron, and may have a changing polarity along the length of the magnet. In some embodiments, the magnet 191 may also be a tapered magnet or may be a magnet that has a variable field strength along its length. In other embodiments, the magnet 191 may have a variable polarization or a variable magnetic domain alignment along its length.

In some embodiments, the sensor 181 and the magnet 191 operates as a Hall effect sensor. That is, the sensor 181 (e.g., a Hall chip) and the magnet 191 are arranged or operated in such a manner as to develop a non-uniform magnetic field (e.g., the magnetic field varies in a periodic manner), and this magnetic field variation will produce a corresponding variation in the potential difference that is induced in the conductors according to the Hall-effect. The sensor 181 can detect variations in the magnetic field experienced by the individual sensing elements of the sensor 181 (e.g., current-carrying conductor) and can be constructed based upon this Hall-effect phenomenon. In one embodiment, using the Hall-effect, the sensor 181 and the magnet 191 assist to determine the tension applied to the plate type tension sensor 120 based at least in part upon a width of the gap 140. That is, the sensor 181, along with the magnet 191, can be configured for sensing and/or detecting movement of the spring structure 148 and measuring the gap 140. The sensor 181 and the magnet 191 may be considered as a magnetic measurement device (e.g., a gap measurer). The sensor 181 can also work in conjunction with the sensor movement detector 130 in FIG. 2.

In other embodiments, the sensor 181 and the magnet 191 may be a magneto-resistive magnetic sensor (xMR), either Anisotropic Magneto-resistance (AMR), Giant Magneto-resistance (GMR) or Tunneling Magneto-resistance (TMR). Depending on the application, various types and geometries of magnets, such as ferrites or rare-earth magnets, may be used.

In an exemplary embodiment, the sensor 181 is coupled to the magnetic field accumulator 184, which operates as an accumulator of the magnetic field. The magnetic field accumulator 184 localizes the magnetic field in proximity to a sensitive Hall-plate of the sensor 181. The magnetic field accumulator 184 may employ a pole-piece material such as a ferromagnetic material (e.g., carbon steel) capable of attracting the magnetic field distribution. As the magnet 191 is moved, its magnetic field distribution is changed. The magnetic field accumulator 184, working as an accumulator of the magnetic field, improves the shape of and guides the flux field generated by the magnet 191 to ensure that the magnetic field strength is recognized by the sensor 181. Thus, the sensor 181 is made more robust and accurate over a wider range when combined with the magnetic field accumulator 184.

Figure 6:
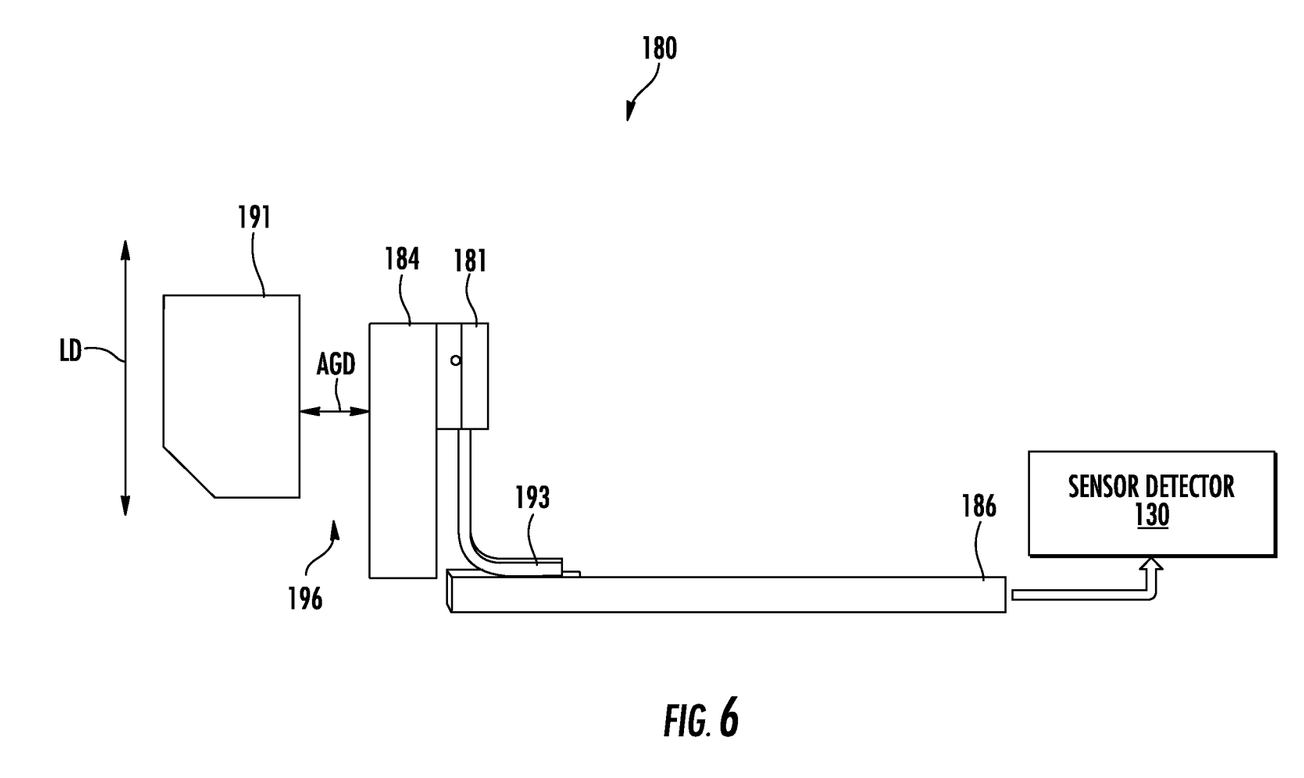
FIG. 6 is a side view of a detector circuit of the sensor system of FIGS. 1-5 in accordance with the present disclosure.

In one embodiment, as shown in FIGS. 5-6, the sensor 181 detects the relative movement between the magnetic field accumulator 184 and the magnet 191. In this embodiment, the gap 140 itself may not be solely measured. Instead, the sensor 181 can be rigidly mounted to the spring plate 150 so that the relative movement between the sensor 181 and the magnet 191 is substantially the same as the movement at the gap 140. The sensor 181 is configured to receive an indication of a magnetic field 196 generated as the magnet 191 and the magnetic field accumulator 184 move relative to one another.

In some embodiments, the magnetic field accumulator 184 and the sensor 181 remain fixed, while the magnet 191 and the plate 124 move along a direction 'D' shown in FIG. 6. During use, as the magnet 191 is moved, the distribution of the magnetic field 196 changes accordingly. For example, as the magnet 191 is moved away from the magnetic field accumulator 184 and the sensor 181, the magnetic field 196 decreases. Inversely, as the magnet 191 is moved towards the magnetic field accumulator 184 and the sensor 181, the magnetic field 196 increases. The sensor 181, in combination with the sensor movement detector 130, recognizes changes in the magnetic field, and correlates these changes to a relative position of the magnet 191. Specifically, the magnetic field indicator 168 of the sensor movement detector 130 continuously observes the magnetic field 196 based on the location of the magnet 191 relative to the magnetic field accumulator 184 and the sensor 181, and may generate an output representing the magnetic field variation. The sensor movement detector 130 may determine where the magnet 191 is located and, therefore, how the plate 124 has moved.

Figure 7:
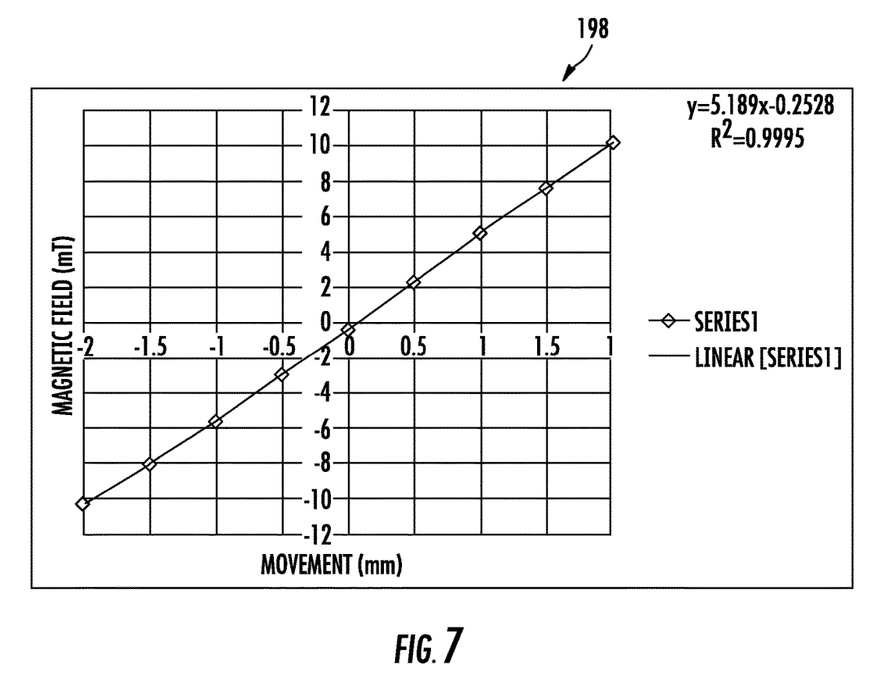
FIG. 7 is a graph illustrating an exemplary output from the sensor system of FIGS. 1-6 in accordance with the present disclosure.

In one embodiment, as shown in FIGS. 6-7, the magnet 191, the magnetic field accumulator 184, and the sensor 181 form the detector circuit 180, wherein the magnet 191 may be separated from the sensor 181 by an air-gap distance 'AGD' of approximately 3 mm, and wherein the magnet 191 moves a linear distance 'LD' of approximately 4 mm. The magnetic field 196 is received by the sensor 181 as the magnet 191 moves linearly past the magnetic field accumulator 184 and the sensor 181, and the sensor movement detector 130 generates an output 198, as shown in FIG. 7, based on the magnetic field. In the graph shown, the independent linearity error for 4 mm of magnet movement is approximately zero. As configured, the accumulated magnetic field 196 of the detector circuit 180 is not affected by external magnetic fields or neighboring ferromagnetic materials because the magnetic field accumulator 184 is positioned relatively close to the magnet 191.

Figure 8:
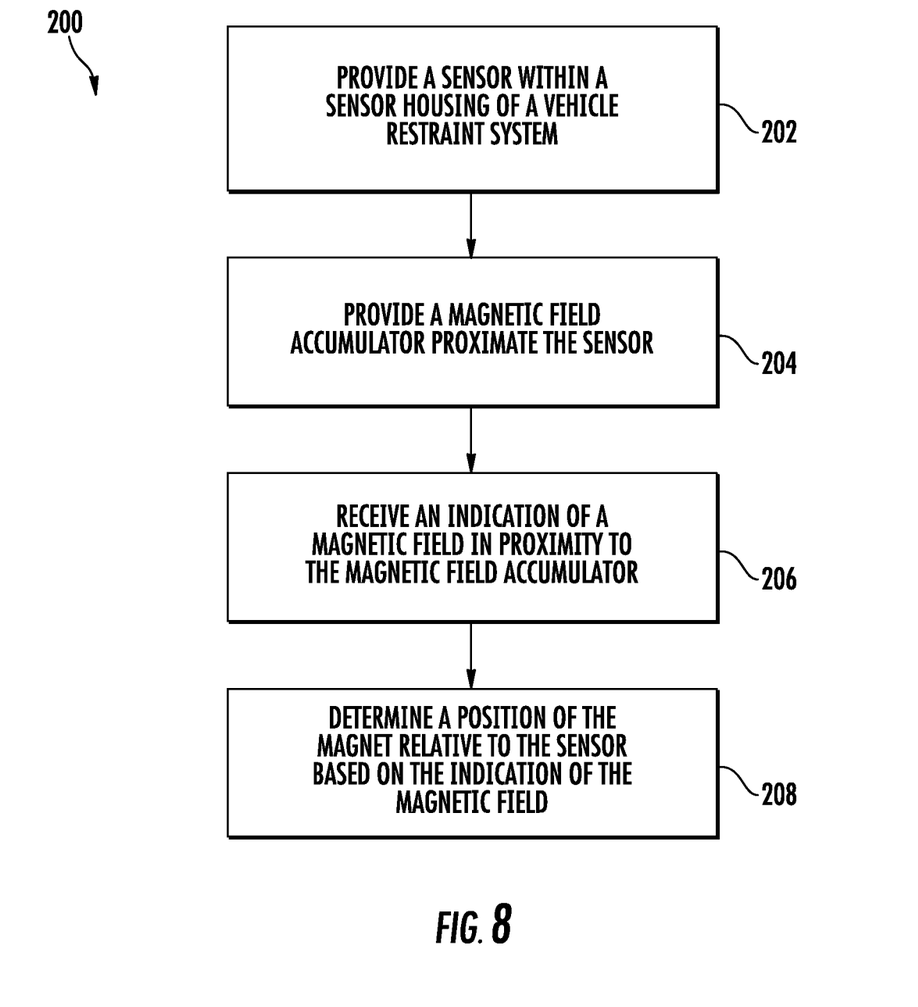
FIG. 8 is a flow chart of an approach for detecting movement of a sensor in accordance with the present disclosure.

FIG. 8 is a flow diagram of a method for detecting movement of a sensor. The method 200 may include providing a sensor within a sensor housing of a vehicle restraint system, wherein the sensor is operable to sense a position of a magnet in proximity to the sensor, as shown by block 202. In some embodiments, the magnet is coupled to a plate of the vehicle restraint system.

The method 200 may further include coupling a magnetic field accumulator to the sensor, as shown by block 204. In some embodiments, the magnetic field accumulator is positioned between the sensor and the magnet. In some embodiments, the magnetic field accumulator is a pole-piece.

The method 200 may further include receiving an indication of a magnetic field in proximity to the magnetic field accumulator, as shown by block 206. In some embodiments, the indication of the magnetic field is received as the magnetic field accumulator and the magnet move relative to one another. In some embodiments, the magnet moves relative to the magnetic field accumulator and the sensor, which are stationary.

The method 200 may further include determining a position of the magnet relative to the magnetic field accumulator according to the measurement of the magnetic field, as shown by block 208. In some embodiments, the sensor is separated from the magnet by a distance of approximately 3 mm. In some embodiments, an output corresponding to a measurement of a strength of the magnetic field is generated.

As disclosed, embodiments herein have at least the following advantages. First, the detector circuit is not affected by external mechanical vibration modes due to the coupling of the magnetic field accumulator and the sensor, nor is it affected by any application mechanical tolerances. Second, the detector circuit is not affected by external magnetic fields or neighboring ferromagnetic materials because the accumulator is close enough to the magnet such that external disturbances will not affect the magnetic field in proximity to the accumulator. Third, the sensor is made more robust and accurate over a wider movement range when combined with the magnetic field accumulator.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The invention claimed is:

1. A detector comprising:
a sensor housing coupled to a plate of a vehicle restraint system;
a sensor disposed within the sensor housing, the sensor operable to sense a position of a magnet in proximity to the sensor, wherein the magnet is positioned external to the sensor housing; and
a magnetic field accumulator directly physically coupled to the sensor, wherein the magnet and the magnetic field accumulator are configured to move relative to one another, and wherein the sensor receives an indication of a magnetic field accumulated by the magnetic field accumulator as the magnet and the magnetic field accumulator move relative to one another.

2. The detector of claim 1, wherein the magnet is coupled to the plate.

3. The detector of claim 1, further comprising a magnet housing adjacent the sensor housing.

4. The detector of claim 3, wherein the magnet housing is disposed around the sensor housing.

5. The detector of claim 1, wherein the magnetic field accumulator is positioned between the sensor and the magnet.

6. The detector of claim 1, wherein the magnetic field accumulator and the sensor are stationary, and the magnet moves relative to the magnetic field accumulator and the sensor.

7. The detector of claim 1, wherein the plate comprises:
a first aperture and a second aperture; and
a spring structure disposed within an interior portion of the plate, wherein the first aperture and the second aperture are moveable relative to each other as tension is applied to the plate, wherein the tension applied to the plate causes the plate to move relative to the spring structure, causing a gap between the spring structure and the plate to increase or decrease.

8. A system for detecting movement of a sensor, the system comprising:
a sensor housing coupled to a plate of a vehicle restraint system; and
a sensor and a pole-piece disposed within the sensor housing, the sensor operable to sense a position of a magnet in proximity to the sensor, wherein the magnet and the pole-piece are operable to move relative to one another, wherein the magnet is positioned external to the sensor housing, wherein the pole-piece is directly physically coupled to the sensor, and wherein the sensor receives an indication of a magnetic field accumulated by the pole-piece as the magnet and the pole-piece move relative to one another.

9. The system of claim 8, wherein the magnet is disposed within a magnet housing, and wherein the magnet housing is coupled to the plate.

10. The system of claim 8, wherein the pole-piece is positioned between the sensor and the magnet.

11. The system of claim 8, wherein the pole-piece and the magnet are separated by a distance of approximately 3 mm.

12. The system of claim 8, wherein the magnet, the pole-piece, and the sensor form part of a magnetic circuit.

13. A method of detecting movement of a sensor, the method comprising:
providing a sensor within a sensor housing of a vehicle restraint system, the sensor operable to sense a position of a magnet in proximity to the sensor, wherein the magnet is positioned external to the sensor housing;
physically coupling a magnetic field accumulator directly to the sensor;
receiving an indication of a magnetic field in proximity to the magnetic field accumulator; and
determining a position of the magnet relative to the sensor based on the indication of the magnetic field.

14. The method of claim 13, further comprising receiving the indication of the magnetic field generated as the magnet and the sensor move relative to one another.

15. The method of claim 13, further comprising coupling the magnet to a plate of the vehicle restraint system.

16. The method of claim 13, further comprising positioning the magnetic field accumulator between the sensor and the magnet.

17. The method of claim 13, further comprising generating an output corresponding to a measurement of a strength of the magnetic field.

* * * * *

UNITED STATES PATENT AND TRADEMARK OFFICE
CERTIFICATE OF CORRECTION

PATENT NO. : 9,989,382 B2
APPLICATION NO. : 14/943755
DATED : June 5, 2018
INVENTOR(S) : Ioannis Anastasiadis, Samuel Fuller and Zulqarnain Khan

Page 1 of 1

It is certified that error appears in the above-identified patent and that said Letters Patent is hereby corrected as shown below:

On the Title Page

Item [71], replace "LITTELFUSE, INC., Chicago, IL (US)" with -- HAMLIN ELECTRONICS (SUZHOU) CO., LTD., Suzhou, Jiangsu Province (CN) --.

Signed and Sealed this
Thirteenth Day of August, 2019

Andrei Iancu
*Director of the United States Patent and Trademark Office*